July 19, 1932.　　　R. S. PEARSON ET AL　　　1,868,251
BRAKE RELEASE
Filed July 28, 1931　　　2 Sheets-Sheet 1
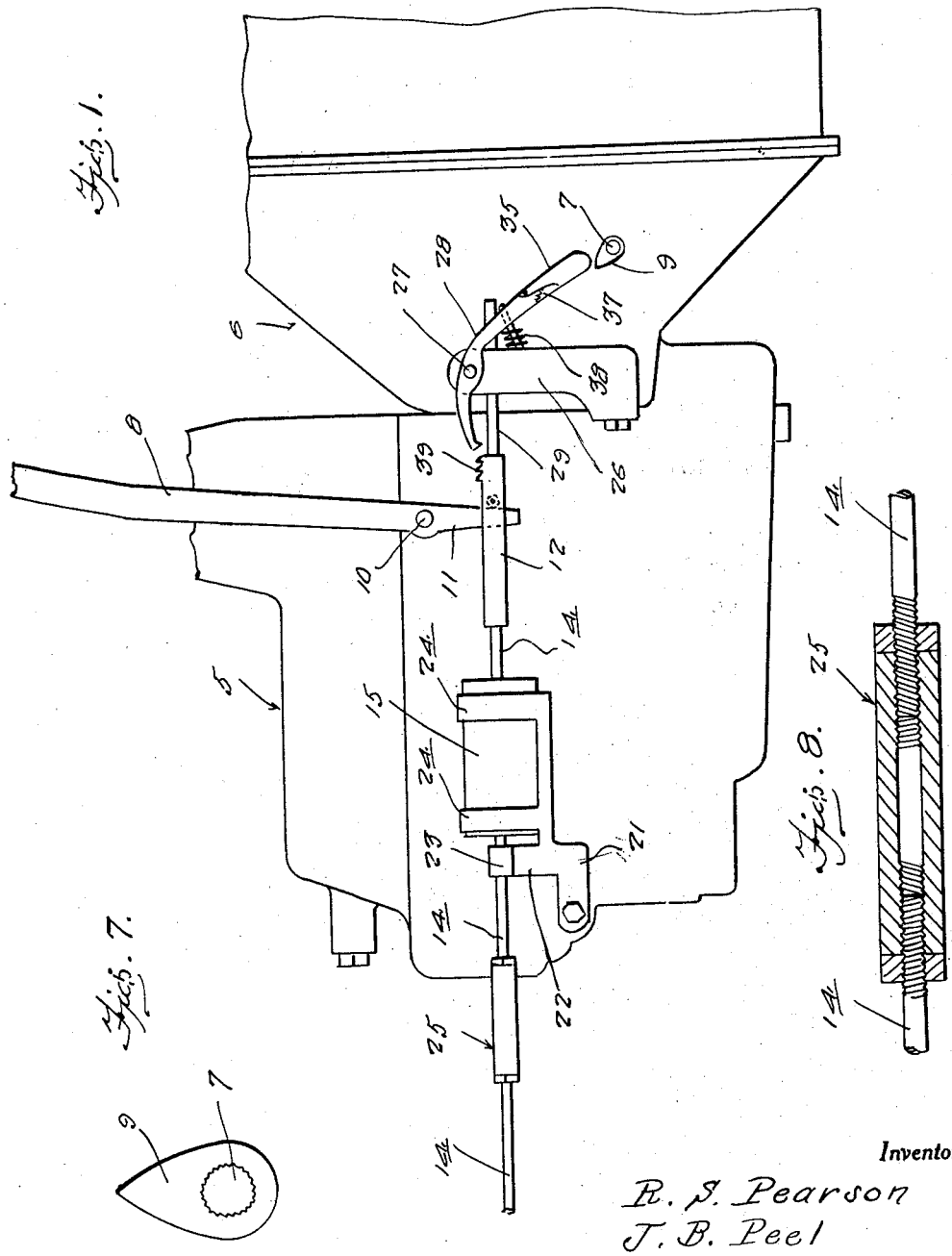
Inventor
R. S. Pearson
J. B. Peel
By Clarence A. O'Brien
　　　　　Attorney July 19, 1932.   R. S. PEARSON ET AL   1,868,251
BRAKE RELEASE
Filed July 28, 1931   2 Sheets-Sheet 2
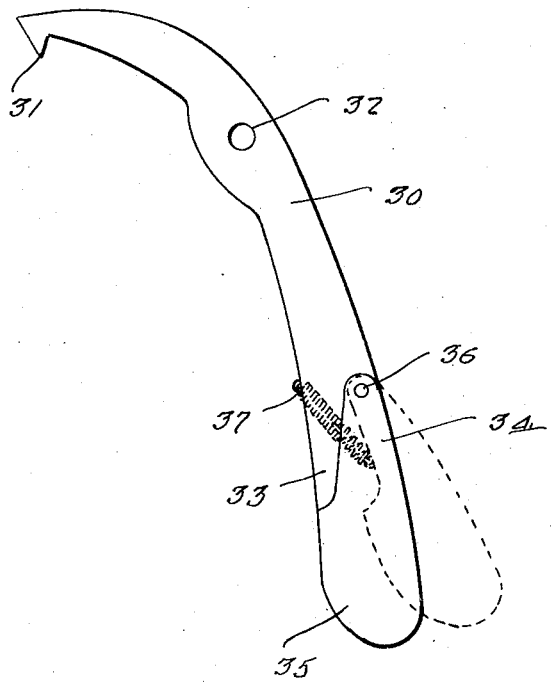
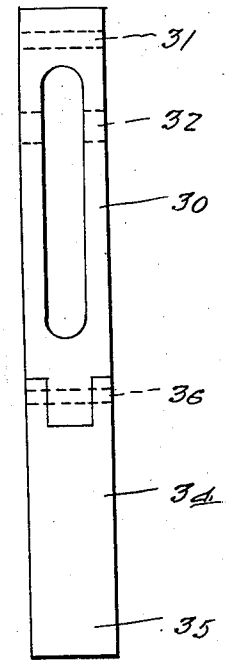
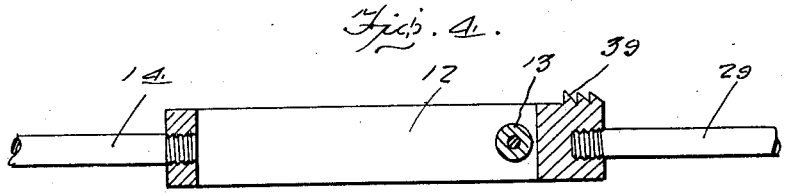
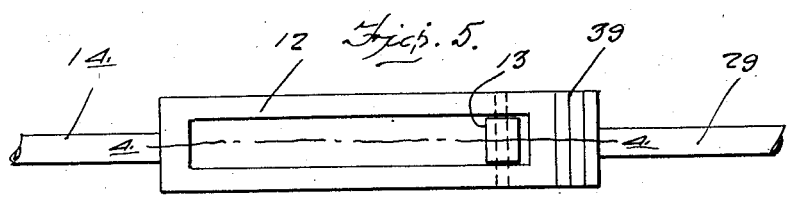
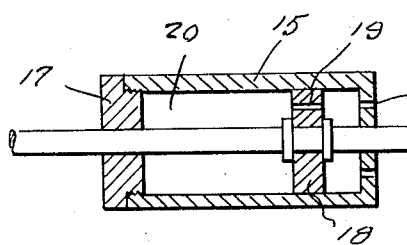
Inventors
R. S. Pearson
J. B. Peel
By Clarence A. O'Brien
Attorney Patented July 19, 1932

1,868,251

UNITED STATES PATENT OFFICE

ROBERT S. PEARSON AND JESSE B. PEEL, OF LOCKPORT, NEW YORK

BRAKE RELEASE

Application filed July 28, 1931. Serial No. 553,614.

This invention relates to new and useful improvements in brake appliances, and more particularly to brakes for automobiles and like vehicles.

The principal object of the invention is to provide a brake appliance adapted to prevent a car when stopped on a grade, from travelling backwards or forwards without the use of the ordinary footbrake besides the possible stalling of the motor when attempting to start from a standstill on a grade.

Another important object of the invention is to provide an automatic release for emergency brakes operative by the usual clutch control.

Other important objects and advantages of the invention will become apparent to the reader of the following specification.

In the drawings:

Figure 1 represents a side elevational view of a transmission showing the appliance associated with a handbrake.

Figure 2 represents a side elevational view of the novel pawl.

Figure 3 represents a front elevational view of the pawl.

Figure 4 represents a longitudinal sectional view taken substantially on line 4—4 of Figure 5.

Figure 5 represents a top plan view of the brake lever yoke.

Figure 6 represents a longitudinal sectional view through the pneumatic cushioning cylinder.

Figure 7 represents a side elevational view of the cam for the clutch shaft.

Figure 8 represents a longitudinal sectional view through the turnbuckle.

Referring to the drawings wherein like numerals designate like parts, it can be seen that numeral 5 generally refers to the usual gear transmission while numeral 6 generally refers to the usual clutch housing through which the usual clutch shaft 7 which is operated by the usual clutch pedal (not shown) extends.

On the side of the transmission adjacent the hand brake lever 8, an outwardly tapering cam 9 is provided on the shaft 7 of the clutch. Numeral 10 represents the fulcrum support for the lever 8 and a depending portion 11 thereof projects downwardly into the rectangular shaped frame 12, which has a roller 13 mounted therein adjacent its forward end, and against which the lower portion 11 of the brake lever operates.

Numeral 14 represents a connecting rod, which extends from the rear end of the frame 12, through the cushioning cylinder 15 to connect to the brakes of the vehicle (not shown). The bored end of the cylinder 15 is closed excepting for the small openings 16, while its opposite end is provided with a removable closure 17.

Suitably secured to the rod 14 is a piston 18 operative in the cylinder 15 and this piston 18 has a by-pass opening 19 therein through which the air content 20 of the cylinder can pass during the motion of the piston 18. Numeral 21 represents a bracket which is provided with an arm 22 constructed to provide a guide 23 for the aforementioned rod 14. This bracket 21 is also provided with straps 24 for clamping engagement with the aforementioned cylinder 15.

The rod 14 may be in sections and between these sections, the turnbuckle 25 can be installed. Numeral 26 represents a block supported on one side of the transmission casing and rockably supported on the pin 27 projecting from this block 26 is the pawl generally referred to by numeral 28. It will also be observed at this point that the forward end of the frame 12 is provided with an extension 29 which can be disposed through an opening in the block 26 so as to guide the forward portion of the frame.

As is clearly shown in Figures 2 and 3, the pawl includes an arcuated shaped bar 30 provided with a hooked head 31 at its upper end and an opening at its intermediate portion denoted by numeral 33 for receiving the aforementioned pin 27. The lower end of this bar 30 is provided with a reduced extension 33 for disposition normally against the reduced extension 34 on the mobile head 35, the same being pivotally connected at its extremity as at 36 to the bar 30 at the inner end of the extension 33.

A coiled spring 37 is provided for normally maintaining the head 35 and bar 30 in alinement. A spring 38 is interposed between the bar 30 and the block 26 (see Figure 1) for normally maintaining the forward end of the bar 30 urged upwardly so that the hook end 31 will be in a position to engage the teeth 39 on the forward end of the frame 12.

It will now be seen that when the brake lever 8 is pulled backwardly, a pull will be exerted on the rod 14 so that the forward end of the frame 12 will be urged under the hook 31 of the pawl 28. The usual clutch pedal is now forced inwardly so as to release the clutch while the gears are being shifted.

Obviously in the upward motion of the cam 9 in the direction of the arrow, the head 35 of the pawl will be free to swing upwardly to permit the cam to pass by the pawl. However, when the clutch pedal is released, the shaft 7 carries the lug downwardly in the opposite direction against the head 35, which results in the rocking of the pawl 28 and the releasing of the hook 31 from the teeth 39 of the frame 12.

Thus, the brake is released simultaneously with the engagement of the clutch.

While the foregoing specification sets forth the invention in specific terms, it is to be understood that numerous changes in the shape, size, and materials may be resorted to without departing from the spirit and scope of the invention as claimed hereinafter.

We claim:

1. In combination, a handbrake lever, a clutch control including a cam, a connecting rod operated by the handlever, teeth on the rod, and a rockable pawl swingable by the cam and being adapted for engagement with the teeth on the rod.

2. In combination, a handbrake lever, a clutch control including a cam, a connecting rod operated by the handlever, teeth on the rod, and a rockable pawl swingable by the cam and being adapted for engagement with the teeth on the rod, said rod being provided with a rectangular shaped frame through which the handbrake extends.

3. In combination, a handbrake lever, a clutch control including a cam, a connecting rod operated by the handlever, teeth on the rod, and a rockable pawl swingable by the cam and being adapted for engagement with the teeth on the rod, said rod being provided with a rectangular shaped frame through which the handbrake extends, and anti-friction means in the frame for engagement with the lever.

4. In combination, a handbrake lever, a clutch control including a cam, a connecting rod operated by the handlever, teeth on the rod, and a rockable pawl swingable by the lug and being adapted for engagement with the teeth on the rod, said pawl being constructed in a pair of separably connected sections, one section being engageable with the teeth and the other section being engageable by the cam.

5. In combination, a handbrake lever, a clutch control including a cam, a connecting rod operated by the handlever, teeth on the rod, and a rockable pawl swingable by the cam and being adapted for engagement with the teeth on the rod, and retarding means in the connecting rod.

In testimony whereof we affix our signatures.

ROBERT S. PEARSON.
JESSE B. PEEL.